US012706430B2

(12) United States Patent
Masubuchi

(10) Patent No.: US 12,706,430 B2
(45) Date of Patent: Aug. 11, 2026

(54) FIBER LASER APPARATUS

(71) Applicant: FUJIKURA LTD., Tokyo (JP)

(72) Inventor: Mitsuaki Masubuchi, Chiba (JP)

(73) Assignee: Fujikura Ltd., Tokyo (JP)

( * ) Notice: Subject to any disclaimer, the term of this patent is extended or adjusted under 35 U.S.C. 154(b) by 745 days.

(21) Appl. No.: 18/164,941

(22) Filed: Feb. 6, 2023

(65) Prior Publication Data

US 2023/0268707 A1 Aug. 24, 2023

(30) Foreign Application Priority Data

Feb. 21, 2022 (JP) ................................ 2022-024415

(51) Int. Cl.

*H01S 3/067* (2006.01)
*H01S 3/04* (2006.01)
*H01S 3/094* (2006.01)
*H01S 3/0941* (2006.01)

(52) U.S. Cl.

CPC ........ *H01S 3/06704* (2013.01); *H01S 3/0407* (2013.01); *H01S 3/0675* (2013.01); *H01S 3/094011* (2013.01); *H01S 3/0941* (2013.01)

(58) Field of Classification Search

CPC ........ H01S 3/04; H01S 3/0405; H01S 3/0407; H01S 3/067; H01S 3/06704

See application file for complete search history.

(56) References Cited

U.S. PATENT DOCUMENTS

2009/0060444 A1 3/2009 Muendel
2009/0147351 A1 6/2009 Oshita et al.
2010/0247055 A1* 9/2010 Arashitani ............ H01S 3/0405 385/137

(Continued)

FOREIGN PATENT DOCUMENTS

EP 2991176 A1 * 3/2016 ........... H01S 3/0675
JP 2008-244483 A 10/2008

(Continued)

OTHER PUBLICATIONS

Office Action issued in counterpart Japanese Patent Application No. 2022-024415 mailed Sep. 9, 2025 (8 pages).

(Continued)

*Primary Examiner* — James A Menefee
(74) *Attorney, Agent, or Firm* — Osha Bergman Watanabe & Burton LLP

(57) ABSTRACT

A fiber laser apparatus includes: amplification optical fibers including first and second amplification optical fibers, each of which having different amplification characteristics and including a core to which an active element is doped; one or more cooling plates having a first cooling surface that thermally contacts and cools the first amplification optical fiber and a second cooling surface that thermally contacts and cools the second amplification optical fiber; one or more module boxes including a gain module box that houses the amplification optical fibers and the one or more cooling plates; and an enclosure housing the one or module boxes. The first and second cooling surfaces are disposed at different heights in the gain module box. At least a portion of the first cooling surface overlaps at least a portion of the second cooling surface as viewed along a height direction.

7 Claims, 7 Drawing Sheets

(56) References Cited

U.S. PATENT DOCUMENTS

| | | | | |
|---|---|---|---|---|
| 2010/0329288 | A1 | 12/2010 | Kitabayashi | |
| 2016/0072248 | A1* | 3/2016 | Johnson | G02B 6/4457 385/135 |
| 2017/0288368 | A1* | 10/2017 | Takazane | H01S 5/02218 |
| 2018/0175577 | A1* | 6/2018 | Hodges | H01S 3/0407 |
| 2019/0280449 | A1* | 9/2019 | Hodges | H01S 3/06704 |
| 2021/0249833 | A1* | 8/2021 | Hovhannisyan | H01S 3/0014 |

FOREIGN PATENT DOCUMENTS

| | | | |
|---|---|---|---|
| JP | 2017168772 | A | 9/2017 |
| JP | 2020-136525 | A | 8/2020 |
| JP | 2021-129069 | A | 9/2021 |
| WO | 2008/010416 | A1 | 1/2008 |
| WO | 2009104691 | A1 | 8/2009 |

OTHER PUBLICATIONS

Notice of Reasons for Refusal issued in corresponding Japanese Application No. 2022-024415, dated Dec. 23, 2025 (8 pages).

Office Action issued in counterpart Japanese Patent Application No. 2022-024415 mailed Mar. 10, 2026 (8 pages).

* cited by examiner

FIBER LASER APPARATUS

BACKGROUND

Technical Field

The present invention relates to a fiber laser apparatus, and more particularly to a fiber laser apparatus including a plurality of amplification optical fibers.

Description of the Related Art

In recent years, there have been developed fiber lasers using a plurality of amplification optical fibers to increase a degree of amplification of a laser beam so as to output a high-power laser beam (see, e.g., JP 2017-168772 A). In such fiber lasers, respective amplification optical fibers are separately housed in module boxes in order to prevent scratches of the amplification optical fibers and attachment of dust to the amplification optical fibers and also to improve maintenance of the amplification optical fibers.

When the fiber laser thus includes a plurality of amplification optical fibers, multiple module boxes need to be arranged, for example, in a vertical direction and housed in an enclosure. Therefore, the thickness of the enclosure that houses the module boxes increases.

SUMMARY

One or more embodiments may provide a fiber laser apparatus capable of outputting a high-power laser beam with a compact structure.

According to one or more embodiments, there is provided a fiber laser apparatus capable of outputting a high-power laser beam with a compact structure. The fiber laser apparatus has a plurality of amplification optical fibers each including a core to which an active element has been doped. The plurality of amplification optical fibers has different amplification characteristics. The fiber laser apparatus also has at least one cooling plate having a first cooling surface held in thermal contact with a first amplification optical fiber of the plurality of amplification optical fibers so as to be capable of cooling the first amplification optical fiber and a second cooling surface held in thermal contact with a second amplification optical fiber of the plurality of amplification optical fibers so as to be capable of cooling the second amplification optical fiber, at least one module box including a gain module box that houses the plurality of amplification optical fibers together with the at least one cooling plate, and an enclosure housing the at least one module box. The first cooling surface and the second cooling surface of the at least one cooling plate are arranged at different heights within the gain module box. At least a portion of the first cooling surface and the second cooling surface is arranged so as to overlap with each other as viewed along a height direction.

DETAILED DESCRIPTION OF THE EMBODIMENTS

Figure 1:
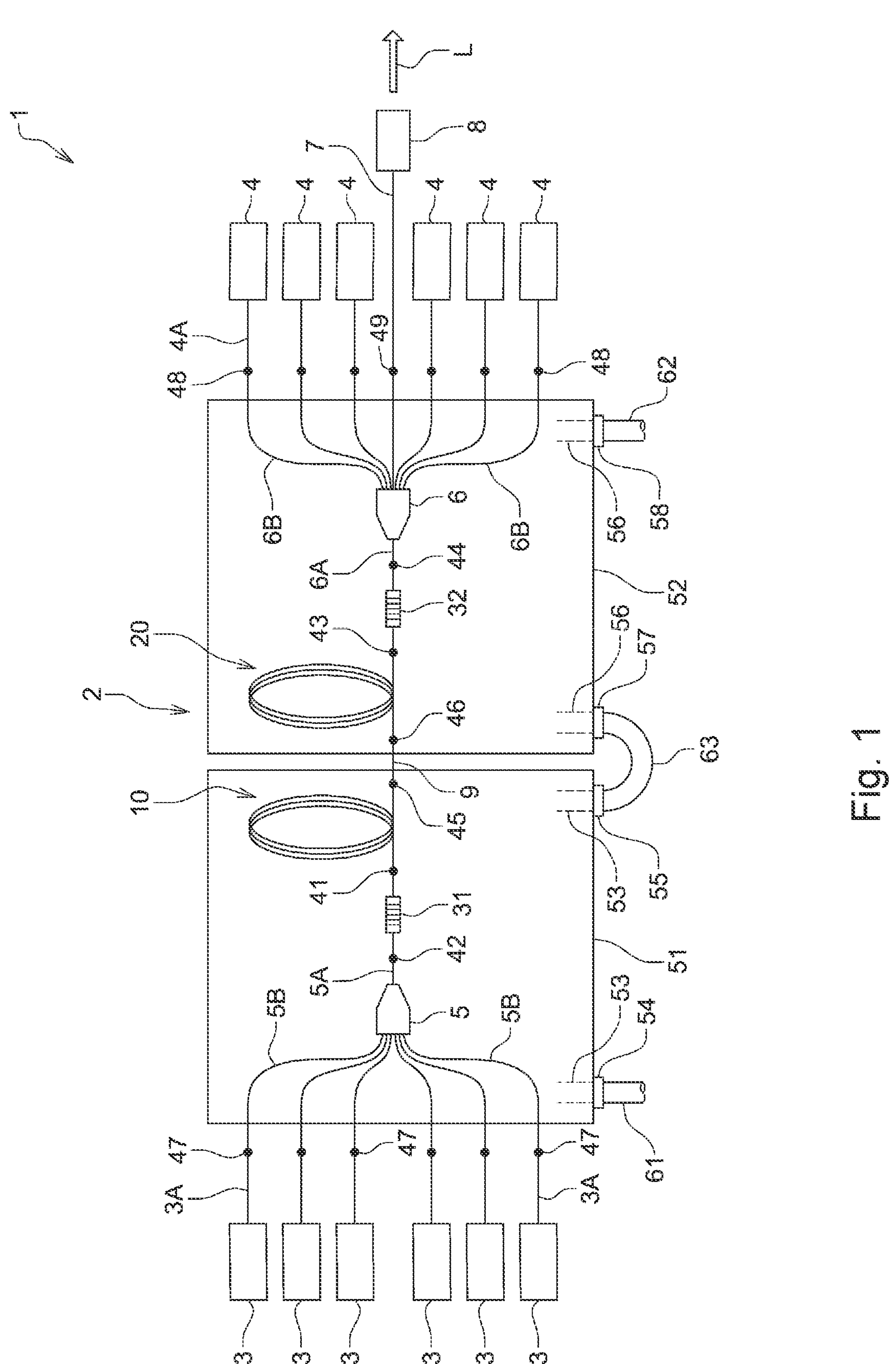
FIG. 1 is a block diagram schematically showing an arrangement of a fiber laser apparatus according to one or more embodiments.

Embodiments of a fiber laser apparatus will be described in detail below with reference to FIGS. 1 to 11. In FIGS. 1 to 11, the same or corresponding components are denoted by the same or corresponding reference numerals and will not be described below repetitively. Furthermore, in FIGS. 1 to 11, the scales or dimensions of components may be exaggerated, or some components may be omitted. Unless mentioned otherwise, in the following description, terms such as “first,” “second,” etc. are only used to distinguish one component from another and are not used to indicate a specific order or a specific sequence.

FIG. 1 is a block diagram schematically showing an arrangement of a fiber laser apparatus 1 according to a first example. As shown in FIG. 1, the fiber laser apparatus 1 has an optical cavity 2 including a first amplification optical fiber 10 and a second amplification optical fiber 20 capable of amplifying a laser beam, a plurality of forward pumping light sources 3 operable to provide pumping light to the optical cavity 2 from one side (front side) of the optical cavity 2, a plurality of backward pumping light sources 4 operable to provide pumping light to the optical cavity 2 from the other side (back side) of the optical cavity 2, an upstream optical combiner 5 operable to combine pumping light outputted from the forward pumping light sources 3 and provide the combined pumping light to the optical cavity 2, a downstream optical combiner 6 operable to combine pumping light outputted from the backward pumping light sources 4 and provide the combined pumping light to the optical cavity 2, a delivery fiber 7 extending from the downstream optical combiner 6, and a laser output portion 8 provided on a downstream end of the delivery fiber 7. Unless otherwise mentioned herein, the term “downstream” refers to a direction in which a laser beam propagates from the optical cavity 2 to the laser output portion 8, and the term “upstream” refers to an opposite direction thereto.

The optical cavity 2 includes a high-reflectivity portion 31 that reflects light having a certain wavelength range (e.g., 1070 nm) at a high reflectivity (e.g., a reflectivity near 100%) and a low-reflectivity portion 32 that reflects light having that wavelength at a reflectivity lower than that of the high-reflectivity portion 31 (e.g., a reflectivity of 10%). Each of the high-reflectivity portion 31 and the low-reflectivity portion 32 is formed of a fiber Bragg grating (FBG) or a mirror in which an optical fiber has a refractive index varying in a periodical manner along a propagation direction of light. In the example illustrated in FIG. 1, each of the high-reflectivity portion 31 and the low-reflectivity portion 32 is formed of a fiber Bragg grating.

The high-reflectivity portion 31 and the first amplification optical fiber 10 are connected to each other at a fusion splice portion 41 by fusion splicing. The high-reflectivity portion 31 and an output fiber 5A of the upstream optical combiner 5 are connected to each other at a fusion splice portion 42 by fusion splicing. The low-reflectivity portion 32 and the second amplification optical fiber 20 are connected to each other at a fusion splice portion 43 by fusion splicing. The low-reflectivity portion 32 and an output fiber 6A of the downstream optical combiner 6 are connected to each other at a fusion splice portion 44 by fusion splicing.

Figure 2:
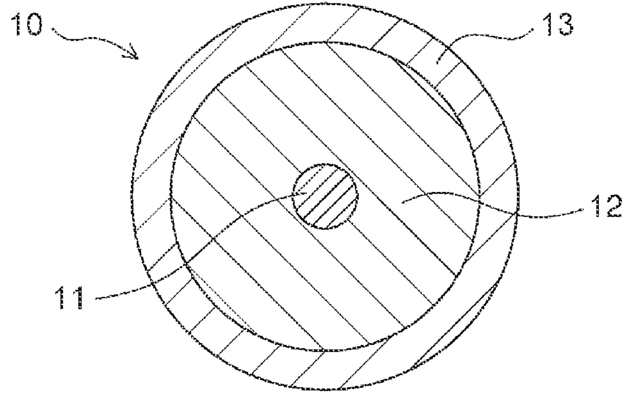
FIG. 2 is a cross-sectional view schematically showing a structure of a first amplification optical fiber in the fiber laser apparatus illustrated in FIG. 1.

FIG. 2 is a cross-sectional view schematically showing a structure of the first amplification optical fiber 10. As shown in FIG. 2, the first amplification optical fiber 10 has a core 11, an inner cladding layer 12 that surrounds an outer circumference of the core 11, and an outer cladding layer 13 that surrounds an outer circumference of the inner cladding layer 12. For example, the core 11 is formed by doping an element for increasing a refractive index, such as aluminum, to silica glass and further doping an active element to at least a portion of the silica glass. Examples of the active element doped to the core 11 include rare earth elements such as ytterbium (Yb), erbium (Er), thulium (Tm), and neodymium (Nd), bismuth (Bi), and chromium (Cr). The present example describes an example in which Yb is doped to the core 11 of the first amplification optical fiber 10. Nevertheless, the present invention is not limited to this example.

For example, the inner cladding layer 12 is formed of silica glass without any dopant being doped thereto. The inner cladding layer 12 has a refractive index lower than a refractive index of the core 11. Thus, an optical waveguide is formed within the core 11. For example, the outer cladding layer 13 is formed of an ultraviolet curable resin. The outer cladding layer 13 has a refractive index lower than the refractive index of the inner cladding layer 12. Thus, an optical waveguide is also formed within the inner cladding layer 12.

Figure 3:
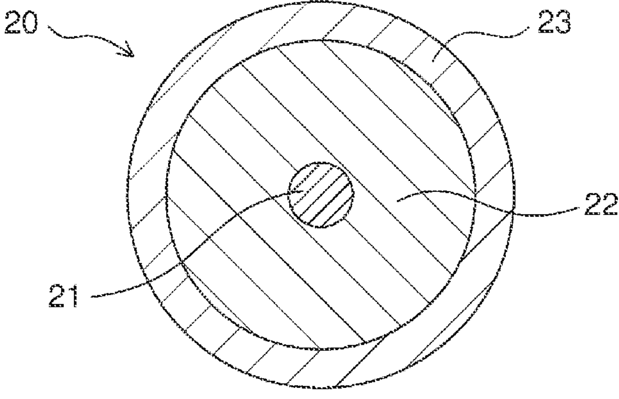
FIG. 3 is a cross-sectional view schematically showing a structure of a second amplification optical fiber in the fiber laser apparatus illustrated in FIG. 1.

FIG. 3 is a cross-sectional view schematically showing a structure of the second amplification optical fiber 20. As shown in FIG. 3, the second amplification optical fiber 20 has a core 21, an inner cladding layer 22 that surrounds an outer circumference of the core 21, and an outer cladding layer 23 that surrounds an outer circumference of the inner cladding layer 22. For example, the core 21 is formed by doping an element for increasing a refractive index, such as aluminum, to silica glass and further doping an active element to at least a portion of the silica glass. Examples of the active element doped to the core 21 include rare earth elements such as ytterbium (Yb), erbium (Er), thulium (Tm), and neodymium (Nd), bismuth (Bi), and chromium (Cr). The present example describes an example in which Yb is doped to the core 21 of the second amplification optical fiber 20. Nevertheless, the present invention is not limited to this example.

For example, the inner cladding layer 22 is formed of silica glass without any dopant being doped thereto. The inner cladding layer 22 has a refractive index lower than a refractive index of the core 21. Thus, an optical waveguide is formed within the core 21. For example, the outer cladding layer 23 is formed of an ultraviolet curable resin. The outer cladding layer 23 has a refractive index lower than the refractive index of the inner cladding layer 22. Thus, an optical waveguide is also formed within the inner cladding layer 22.

The first amplification optical fiber 10 and the second amplification optical fiber 20 have different amplification characteristics. For example, the first amplification optical fiber 10 and the second amplification optical fiber 20 differ from each other in at least one of characteristics including types of the active elements, doping concentrations of the active element, diameters of the cores, lengths of the fibers, and the like and thus have different amplification characteristics.

An intermediate optical fiber 9 is connected between the first amplification optical fiber 10 and the second amplification optical fiber 20. The intermediate optical fiber 9 has a core, an inner cladding layer that surrounds an outer circumference of the core, and an outer cladding layer that surrounds an outer circumference of the inner cladding layer. For example, the core of the intermediate optical fiber 9 is formed by doping an element for increasing a refractive index, such as aluminum, to silica glass but not doping an active element, unlike the first amplification optical fiber 10 and the second amplification optical fiber 20. Thus, the intermediate optical fiber 9 is what is called a passive optical fiber. For example, the inner cladding layer is formed of silica glass without any dopant being doped thereto. The inner cladding layer has a refractive index lower than a refractive index of the core. Thus, an optical waveguide is formed within the core. For example, the outer cladding layer is formed of an ultraviolet curable resin. The outer cladding layer has a refractive index lower than the refractive index of the inner cladding layer. Thus, an optical waveguide is also formed within the inner cladding layer. The intermediate optical fiber 9 is connected to the first amplification optical fiber 10 at a fusion splice portion 45 by fusion splicing and connected to the second amplification optical fiber 20 at a fusion splice portion 46 by fusion splicing.

Each of the forward pumping light sources 3 and the backward pumping light sources 4 includes, for example, a Fabry-Perot semiconductor laser device formed of a GaAs-based semiconductor material and, for example, generates pumping light having a center wavelength of 915 nm. The wavelength of the pumping light generated by the forward pumping light sources 3 and the wavelength of the pumping light generated by the backward pumping light sources 4 may not necessarily be the same and may be different from each other.

Optical fibers 3A extending from the forward pumping light sources 3 are connected to input fibers 5B of the upstream optical combiner 5 at fusion splice portions 47 by fusion splicing. Optical fibers 4A extending from the backward pumping light sources 4 are connected to input fibers 6B of the downstream optical combiner 6 at fusion splice portions 48 by fusion splicing. Furthermore, the delivery fiber 7 is connected to the input fiber 6B of the downstream optical combiner 6 at a fusion splice portion 49 by fusion splicing.

The upstream optical combiner 5 is configured to combine the pumping light beams outputted from a plurality of forward pumping light sources 3 and allow the combined pumping light beams to enter the inner cladding layer 12 of the first amplification optical fiber 10. The downstream optical combiner 6 is configured to combine the pumping light beams outputted from a plurality of backward pumping light sources 4 and allow the combined pumping light beams to enter the inner cladding layer 22 of the second amplification optical fiber 20.

In the optical cavity 2, when the pumping light propagating through the inner cladding layer 12 of the first amplification optical fiber 10 passes through the core 11, it is absorbed in Yb so that Yb is excited to produce spontaneous emission. Furthermore, when the pumping light propagating through the inner cladding layer 22 of the second amplification optical fiber 20 passes through the core 21, it is absorbed in Yb so that Yb is excited to produce spontaneous emission. The spontaneous emission produced by excitation of Yb is recursively reflected between the high-reflectivity portion 31 and the low-reflectivity portion 32, so that light having a specific wavelength (e.g., 1064 nm) is amplified to cause laser oscillation. The laser beam L amplified by the optical cavity 2 propagates through the core 11 of the first amplification optical fiber 10 and the core 21 of the second amplification optical fiber 20. A portion of the laser beam L transmits through the low-reflectivity portion 32 and propagates downstream. The laser beam L that has transmitted through the low-reflectivity portion 32 propagates through the delivery fiber 7. Then the laser beam L is emitted from the laser output portion 8 toward, for example, a workpiece.

As shown in FIG. 1, the fiber laser apparatus 1 includes a first cooling plate 51 and a second cooling plate 52 each of which is formed of a material having a high thermal conductivity (e.g., aluminum or copper). In one or more embodiments, a water-cooling plate using water as a cooling medium is used for the cooling plates 51 and 52. Nevertheless, other cooling plates using an antifreezer or air other than water as a cooling medium may also be used for the cooling plates 51 and 52.

Specifically, a cooling water passage 53 for allowing cooling water to pass therethrough is formed within the first cooling plate 51. An inlet port 54 for supplying cooling water as a cooling medium to the cooling water passage 53 and an outlet port 55 for discharging the cooling water that has passed through the cooling water passage 53 are formed on a side surface of the first cooling plate 51. Cooling water is supplied from the inlet port 54 to the cooling water passage 53, flowed through the cooling water passage 53, and then discharged from the outlet port 55.

Similarly, a cooling water passage 56 for allowing cooling water to pass therethrough is formed within the second cooling plate 52. An inlet port 57 for suppling cooling water to the cooling water passage 56 and an outlet port 58 for discharging the cooling water that has passed through the cooling water passage 56 are formed on a side surface of the second cooling plate 52. Cooling water is supplied from the inlet port 57 to the cooling water passage 56, flowed through the cooling water passage 56, and then discharged from the outlet port 58.

The upstream optical combiner 5, the high-reflectivity portion 31, the fusion splice portion 42 between the upstream optical combiner 5 and the high-reflectivity portion 31, the first amplification optical fiber 10, the fusion splice portion 41 between the high-reflectivity portion 31 and the first amplification optical fiber 10, and the fusion splice portion 45 between the first amplification optical fiber 10 and the intermediate optical fiber 9 are respectively fixed on a surface of the first cooling plate 51, for example, by a resin or the like. Thus, those optical components and the first cooling plate 51 are brought into thermal contact with each other. Those optical components fixed on the surface of the first cooling plate 51 are hereinafter collectively referred to as a first group of optical components. With this configuration, heat generated by the first group of optical components is transferred to the first cooling plate 51, exchanged with the cooling water circulated through the cooling water passage 53 of the first cooling plate 51, and thus radiated. As a result, the first group of optical components is cooled.

The downstream optical combiner 6, the low-reflectivity portion 32, the fusion splice portion 44 between the downstream optical combiner 6 and the low-reflectivity portion 32, the second amplification optical fiber 20, the fusion splice portion 43 between the low-reflectivity portion 32 and the second amplification optical fiber 20, and the fusion splice portion 46 between the second amplification optical fiber 20 and the intermediate optical fiber 9 are respectively fixed on a surface of the second cooling plate 52. Thus, those optical components and the second cooling plate 52 are brought into thermal contact with each other. Those optical components fixed on the surface of the second cooling plate 52 are hereinafter collectively referred to as a second group of optical components. With this configuration, heat generated by the second group of optical components is transferred to the second cooling plate 52, exchanged with the cooling water circulated through the cooling water passage 56 of the second cooling plate 52, and thus radiated. As a result, the second group of optical components is cooled.

Different sources of cooling water may be used between the cooling water flowing through the cooling water passage 53 of the first cooling plate 51 and the cooling water flowing through the cooling water passage 56 of the second cooling plate 52. In one or more embodiments, however, the same source of cooling water is used for the cooling water flowing through the cooling water passage 53 of the first cooling plate 51 and the cooling water flowing through the cooling water passage 56 of the second cooling plate 52. More specifically, a feed water pipe 61 to which cooling water is supplied from an exterior of the apparatus is connected to the inlet port 54 of the first cooling plate 51, and a drain water pipe 62 for discharging the cooling water to the exterior of the apparatus is connected to the outlet port 58 of the second cooling plate 52. The outlet port 55 of the first cooling plate 51 and the inlet port 57 of the second cooling plate 52 are connected to each other by a connection pipe 63. With this configuration, cooling water is supplied to the cooling water passage 53 of the first cooling plate 51 via the feed water pipe 61. The cooling water that has been supplied to the cooling water passage 53 exchanges heat with an internal surface of the cooling water passage 53 while it flows through the cooling water passage 53. The cooling water discharged from the cooling water passage 53 of the first cooling plate 51 is supplied to the cooling water passage 56 of the second cooling plate 52 through the connection pipe 63. The cooling water that has been supplied to the cooling water passage 56 of the second cooling plate 52 exchanges heat with an internal surface of the cooling water passage 56 while it flows through the cooling water passage 56. Then the cooling water is discharged from the second cooling plate 52 via the drain water pipe 62.

In this manner, when the same source of cooling water is used for the cooling water flowing through the cooling water passage 53 of the first cooling plate 51 and the cooling water flowing through the cooling water passage 56 of the second cooling plate 52, which is located adjacent to the first cooling plate 51, a required quantity of cooling water can be reduced as compared to the case where different sources of cooling water are used between the cooling water flowing through the cooling water passage 53 of the first cooling plate 51 and the cooling water flowing through the cooling water passage 56 of the second cooling plate 52.

Figure 4:
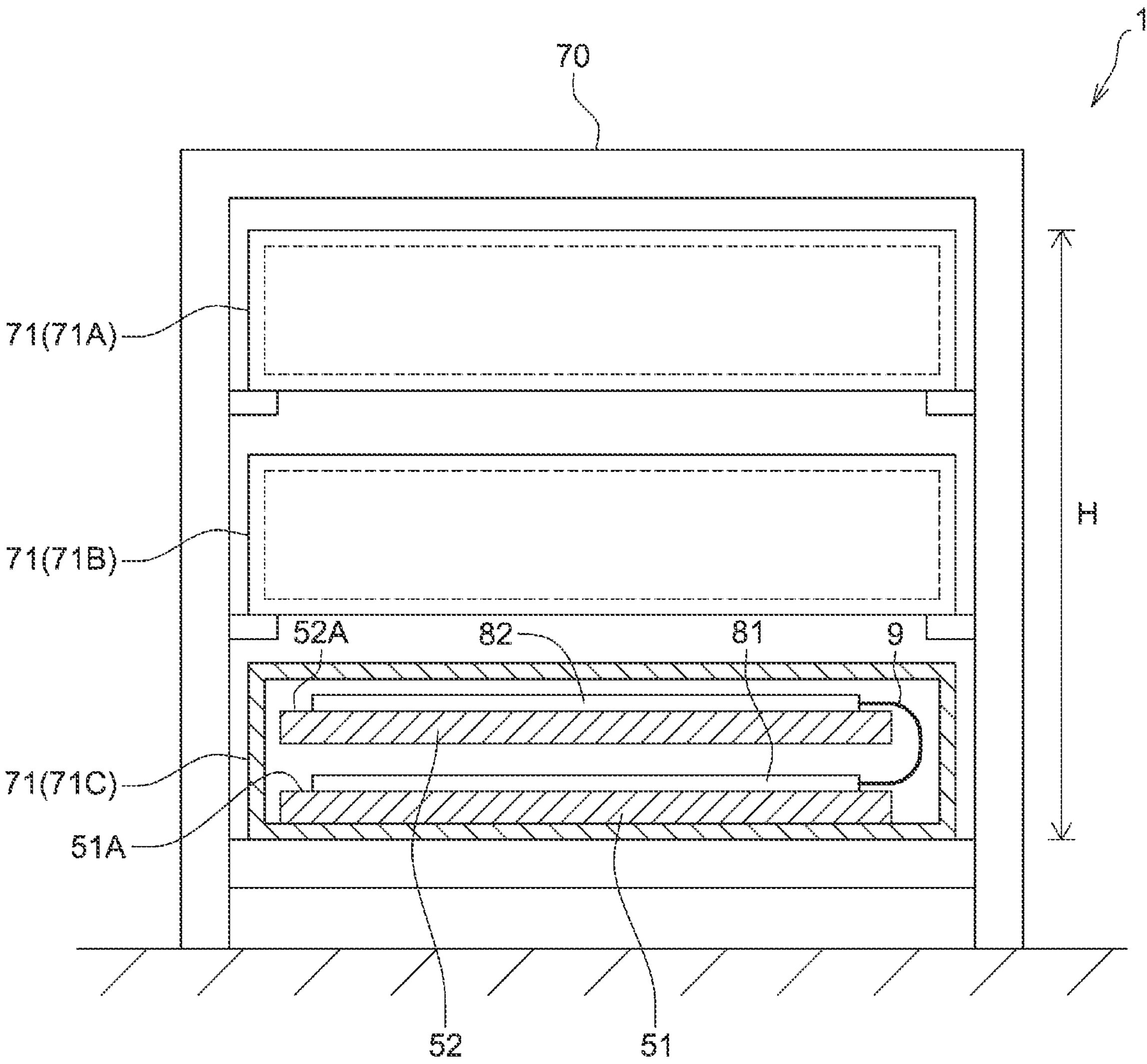
FIG. 4 is a schematic diagram showing an installation arrangement of the fiber laser apparatus illustrated in FIG. 1.

FIG. 4 is a schematic diagram showing an installation arrangement of the fiber laser apparatus 1. As shown in FIG. 4, the fiber laser apparatus 1 includes an enclosure 70 housing one or more module boxes 71 that house various optical components as described above. In one or more embodiments, three module boxes 71 are housed in the enclosure 70. The two cooling plates 51 and 52 as described above are housed in one module box 71C (gain module box) of the three module boxes 71. Those cooling plates 51 and 52 are arranged side by side in a thickness direction of the cooling plates 51 and 52 and fixed within the module box 71C by support portions, which are not illustrated.

As shown in FIG. 4, the first group of optical components 81 is fixed onto the upper surface 51A (first cooling surface) of the first cooling plate 51, and the second group of optical components 82 is fixed onto the upper surface 52A (second cooling surface) of the second cooling plate 52. Thus, in one or more embodiments, the first group of optical components 81 fixed to the first cooling plate 51 and the second group of optical components 82 fixed to the second cooling plate 52 do not face each other. With this configuration, even if one of the two amplification optical fibers 10 and 20 is broken so that light leaks out of the amplification optical fiber, the light that has leaked out of the one amplification optical fiber is inhibited from causing damage to the other amplification optical fiber because the one amplification optical fiber does not face the other amplification optical fiber.

Furthermore, since the two amplification optical fibers 10 and 20 are fixed to the separate cooling plates 51 and 52, respectively, heat generated by one of the two amplification optical fibers 10 and 20 is inhibited from exerting influence on the other amplification optical fiber fixed to the other cooling plate.

As shown in FIG. 4, in one or more embodiments, the first cooling surface 51A of the first cooling plate 51 in thermal contact with the first amplification optical fiber 10 and the second cooling surface 52A of the second cooling plate 52 in thermal contact with the second amplification optical fiber 20 are arranged at different heights within the gain module box 71A. The first cooling surface 51A of the first cooling plate 51 and the second cooling surface 52A of the second cooling plate 52 are arranged so as to overlap with each other as viewed along the height direction. Since the two amplification optical fibers 10 and 20 are thus housed together with the two cooling plates 51 and 52 in one gain module box 71C, the height (thickness) H of all of the module boxes 71 occupying the interior of the enclosure 70 can be reduced as compared to a case where the respective amplification optical fibers 10 and 20 are housed in separate module boxes 71. Meanwhile, if the intermediate optical fiber 9, which connects between the amplification optical fibers 10 and 20, becomes longer, the stimulated Raman scattering tends to increase. According to one or more embodiments, the length of the intermediate optical fiber 9 can be reduced in the gain module box 71C. Therefore, the stimulated Raman scattering generated by the intermediate optical fiber 9 can be reduced.

Optical components other than the aforementioned first group of optical components 81 and second group of optical components 82 are housed in the module box 71A or 71B. For example, the forward pumping light sources 3 are housed in the module box 71B, and the backward pumping light sources 4 are housed in the module box 71A. The first group of optical components 81 arranged on the first cooling plate 51 should include at least the first amplification optical fiber 10. The second group of optical components 82 arranged on the second cooling plate 52 should include at least the second amplification optical fiber 20.

Figure 5:
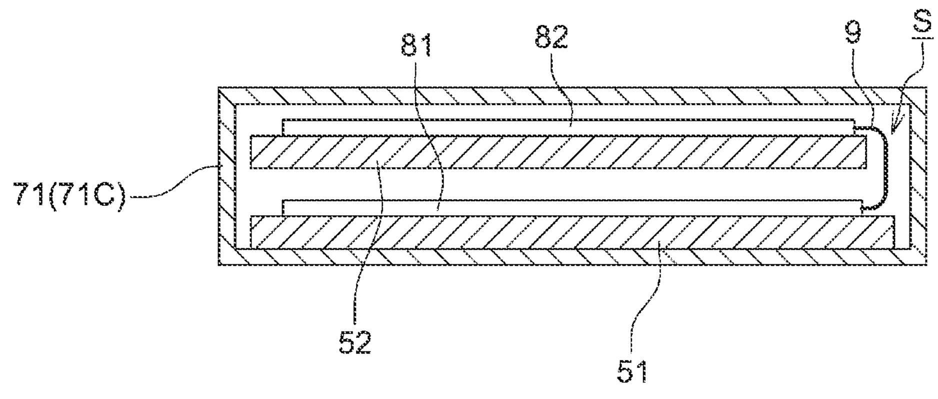
FIG. 5 is a schematic diagram showing a variation of the arrangement in a module box illustrated in FIG. 4.

In order to further reduce the length of the intermediate optical fiber 9 connecting between the amplification optical fibers 10 and 20, as shown in FIG. 5, the size of one of the cooling plates 51 and 52 may be made smaller than the size of the other cooling plate so as to form a space S for routing the intermediate optical fiber 9 between the amplification optical fibers 10 and 20. In the example illustrated in FIG. 5, the size of the second cooling plate 52 is made smaller than the size of the first cooling plate 51.

Figure 6:
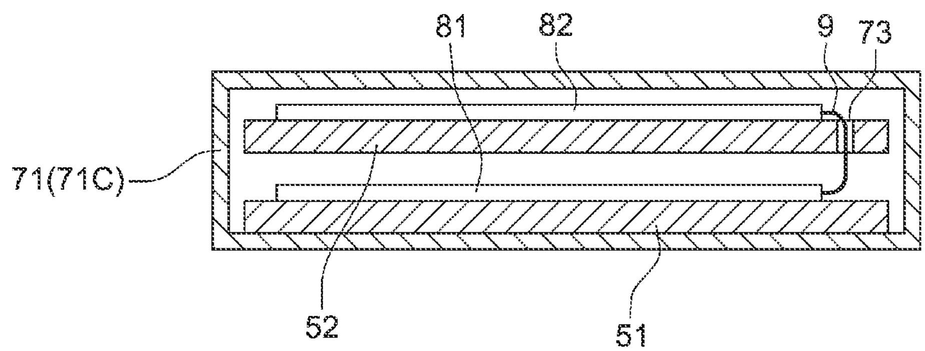
FIG. 6 is a schematic diagram showing another variation of the arrangement in the module box illustrated in FIG. 4.

Alternatively, as shown FIG. 6, a fiber hole or a notch may be formed in one of the cooling plates 51 and 52 for routing the intermediate optical fiber 9 between the amplification optical fibers 10 and 20. In the example illustrated in FIG. 6, a fiber hole 73 is formed in the second cooling plate 52 so that intermediate optical fiber 9 passes through the fiber hole 73, reducing the length of the intermediate optical fiber 9 connecting between the amplification optical fibers 10 and 20.

Figure 7:
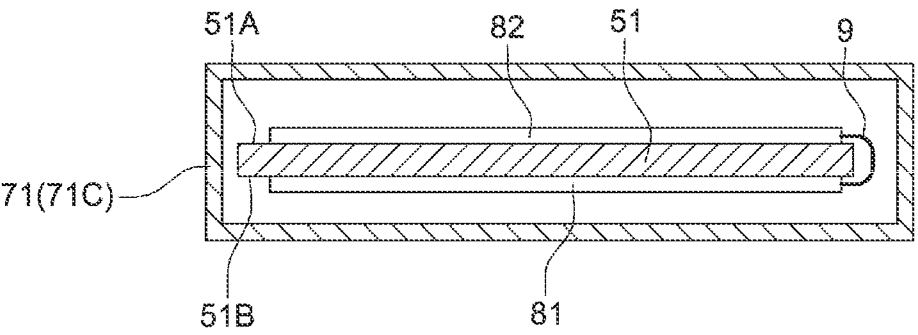
FIG. 7 is a schematic diagram showing still another variation of the arrangement in the module box illustrated in FIG. 4.

Furthermore, as shown in FIG. 7, the first group of optical components 81 including the first amplification optical fiber 10 may be arranged on one side (e.g., a lower surface 51B) of the first cooling plate 51, and the second group of optical components 82 including the second amplification optical fiber 20 may be arranged on the other side (e.g., an upper surface 51A) of the first cooling plate 51. With this configuration, the two amplification optical fibers 10 and 20 can be arranged on one cooling plate 51. Therefore, the thickness of the gain module box 71C can further be reduced as compared to the case where the two amplification optical fibers 10 and 20 are arranged on the separate cooling plates 51 and 52, respectively (see FIG. 4). As a result, the height H of all of the module boxes 71 occupying the interior of the enclosure 70 can further be reduced.

Figure 8:
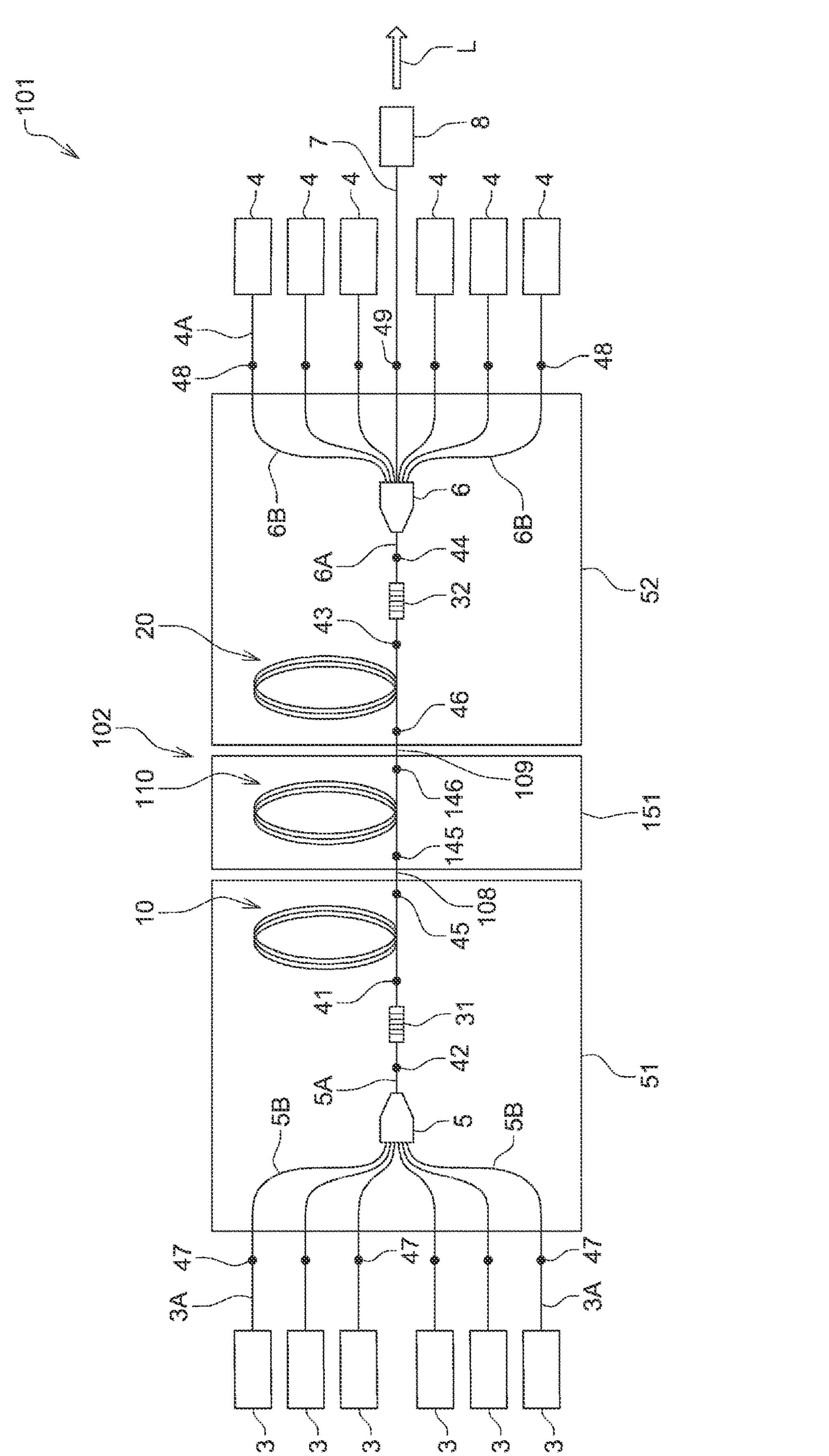
FIG. 8 is a block diagram schematically showing an arrangement of a fiber laser apparatus according to one or more embodiments.

FIG. 8 is a block diagram schematically showing an arrangement of a fiber laser apparatus 101 according to a second example. The fiber laser apparatus 101 of one or more embodiments includes a third amplification optical fiber 110 between the first amplification optical fiber 10 and the second amplification optical fiber 20 of the first example. In other words, the present example has an optical cavity 102 including the first amplification optical fiber 10, the second amplification optical fiber 20, and the third amplification optical fiber 110. The third amplification optical fiber 110 has the same structure as the first amplification optical fiber 10 and the second amplification optical fiber 20. Therefore, although not illustrated, the third amplification optical fiber 110 has a core to which an active element has been doped, an inner cladding layer that surrounds an outer circumference of the core, and an outer cladding layer that surrounds an outer circumference of the inner cladding layer. The third amplification optical fiber 110 has different amplification characteristics than those of the first amplification optical fiber 10 and the second amplification optical fiber 20.

An intermediate optical fiber 108 is connected between the first amplification optical fiber 10 and the third amplification optical fiber 110. The intermediate optical fiber 108 is connected to the first amplification optical fiber 10 at a fusion splice portion 45 by fusion splicing and connected to the third amplification optical fiber 110 at a fusion splice portion 145 by fusion splicing. Furthermore, an intermediate optical fiber 109 is connected between the third amplification optical fiber 110 and the second amplification optical fiber 20. The intermediate optical fiber 109 is connected to the third amplification optical fiber 110 at a fusion splice portion 146 by fusion splicing and connected to the second amplification optical fiber 20 at a fusion splice portion 46 by fusion splicing.

The fiber laser apparatus 101 of one or more embodiments includes a third cooling plate 151, which has the same structure as the cooling plates 51 and 52 of the first example. In the present example, a water-cooling plate using water as a cooling medium is used for the third cooling plate. A cooling water passage for allowing cooling water to pass therethrough, an inlet port for supplying cooling water to the cooling water passage, and an outlet port for discharging the cooling water that has passed through the cooling water passage are formed in the third cooling plate 151 as with the first cooling plate 51 and the second cooling plate 52. Cooling water is supplied from the inlet port to the cooling water passage, flowed through the cooling water passage, and then discharged from the outlet port.

The third amplification optical fiber 110, the fusion splice portion 145 between the intermediate optical fiber 108 and the third amplification optical fiber 110, and the fusion splice portion 146 between the third amplification optical fiber 110 and the intermediate optical fiber 109 are respectively fixed on a surface of the third cooling plate 151, for example, by a resin or the like. Thus, those optical components and the third cooling plate 151 are brought into thermal contact with each other. Those optical components fixed on the surface of the third cooling plate 151 are hereinafter collectively referred to as a third group of optical components. With this configuration, heat generated by the third group of optical components is transferred to the third cooling plate 151, exchanged with the cooling water circulated through the cooling water passage inside of the third cooling plate 151, and thus radiated. As a result, the third group of optical components is cooled.

Figure 9:
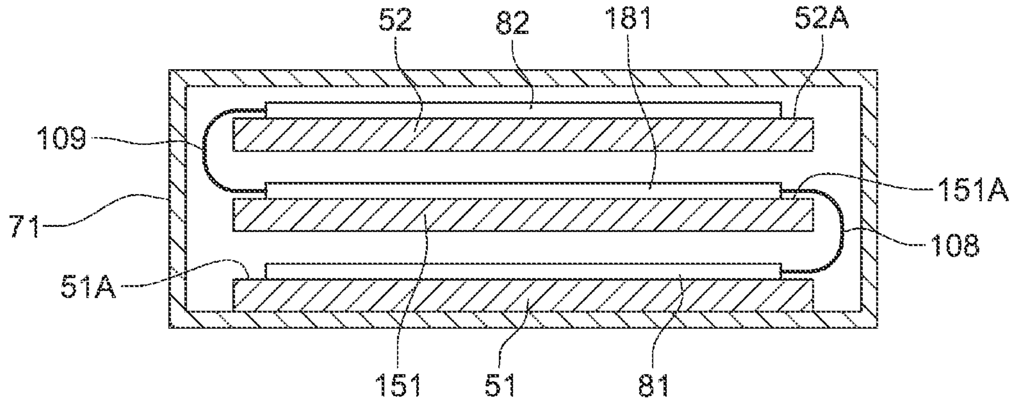
FIG. 9 is a schematic diagram showing an example of an arrangement of a gain module box in the fiber laser apparatus illustrated in FIG. 8.

For example, as shown in FIG. 9, the first cooling plate 51, the second cooling plate 52, and the third cooling plate 151 are housed side by side in a thickness direction of the cooling plates 51, 52, and 151 within one module box 71 (gain module box). In the example illustrated in FIG. 9, the first group of optical components 81 is fixed onto an upper surface 51A of the first cooling plate 51, the second group of optical components 82 is fixed onto an upper surface 52A of the second cooling plate 52, and the third group of optical components 181 is fixed onto an upper surface 151A of the third cooling plate 151. In other words, the first group of optical components 81 fixed to the first cooling plate 51, the second group of optical components 82 fixed to the second cooling plate 52, and the third group of optical components 181 fixed to the third cooling plate 151 do not face each other. Thus, when either one of the amplification optical fibers is broken, the other amplification optical fibers are unlikely to be damaged. The third group of optical components 181 arranged on the third cooling plate 151 should include at least the third amplification optical fiber 110.

In this case, as described in connection with FIG. 5, the size of at least one of the cooling plates 51, 52, and 151 may be made smaller than the size of the other cooling plates so as to form a space for routing the intermediate optical fiber 108 and/or the intermediate optical fiber 109. Furthermore, as described in connection with FIG. 6, a hole or a notch may be formed in at least one of the cooling plates 51, 52, and 151 for routing the intermediate optical fiber 108 and/or the intermediate optical fiber 109. In those cases, the length of the intermediate optical fiber 108 or 109 can be reduced, so that the stimulated Raman scattering generated by the intermediate optical fiber 109 or 109 can be reduced.

Figure 10:
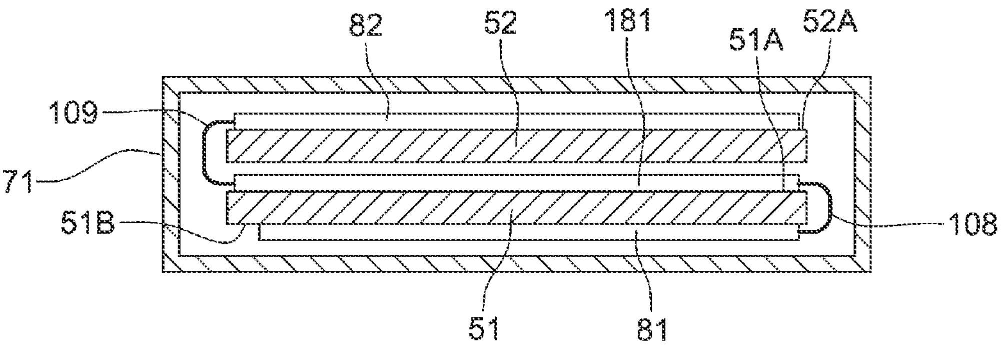
FIG. 10 is a schematic diagram showing another example of an arrangement of the gain module box in the fiber laser apparatus illustrated in FIG. 8.

As shown in FIG. 10, the first group of optical components 81 including the first amplification optical fiber 10 may be arranged on a lower surface 51B of the first cooling plate 51, the third group of optical components 181 including the third amplification optical fiber 110 may be arranged on an upper surface 51A of the first cooling plate 51, and the second group of optical components 82 including the second amplification optical fiber 20 may be arranged on an upper surface 52A of the second cooling plate 52. With this configuration, the thickness of the gain module box 71 can be reduced as compared to the configuration illustrated in FIG. 9.

Figure 11:
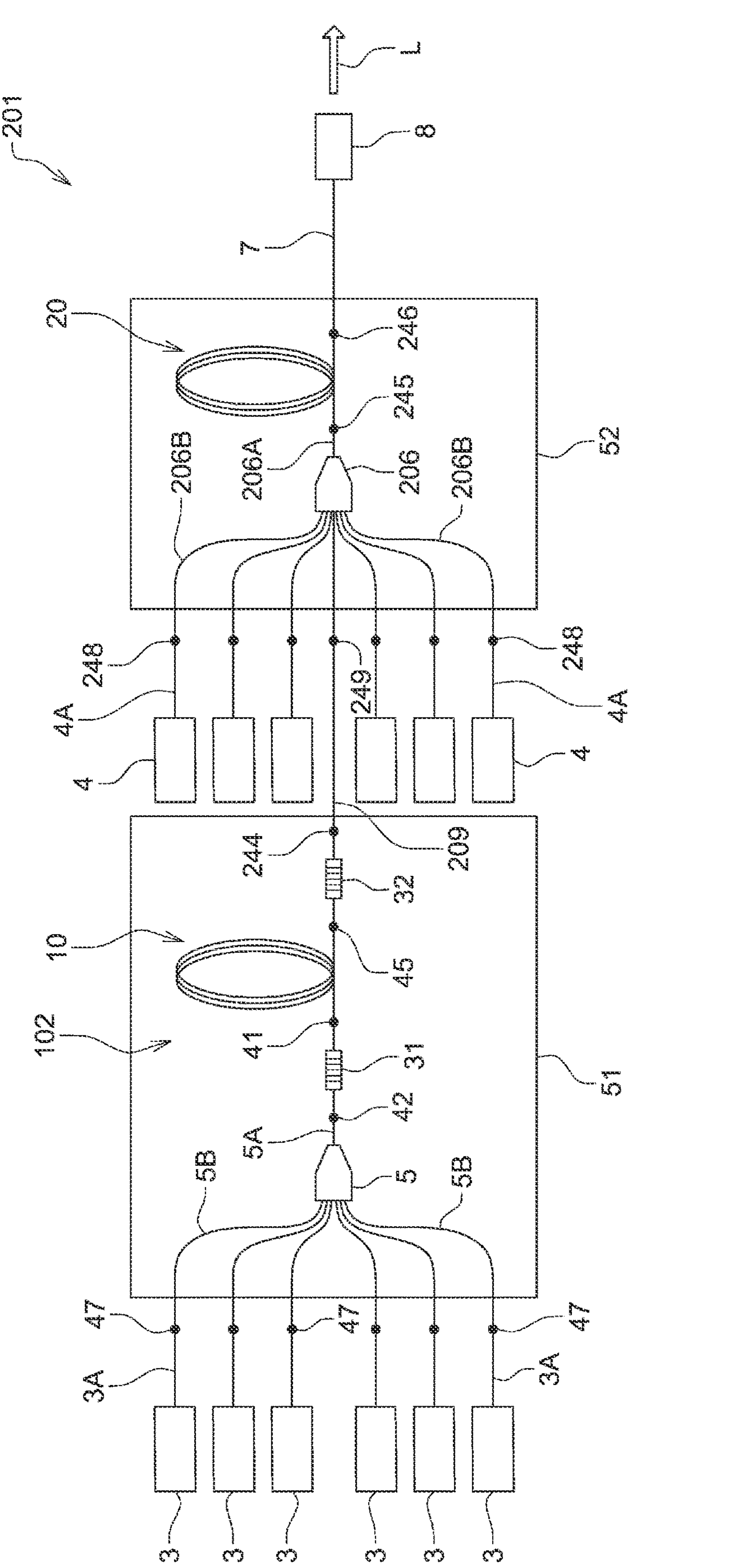
FIG. 11 is a block diagram schematically showing an arrangement of a fiber laser apparatus according to one or more embodiments.

FIG. 11 is a block diagram schematically showing an arrangement of a fiber laser apparatus 201 according to a third example. The configuration of the cooling plates 51 and 52 of the aforementioned first example is applicable to the fiber laser apparatus 201 of the third example. The fiber laser apparatus 201 is a MOPA type fiber laser.

In one or more embodiments, the low-reflectivity portion 32 of the first example is moved to an upstream side of the second amplification optical fiber 20. A downstream optical combiner 206 is located between the low-reflectivity portion 32 and the second amplification optical fiber 20. Furthermore, an intermediate optical fiber 209 is connected between the low-reflectivity portion 32 and the downstream optical combiner 206.

The second amplification optical fiber 20 and an output fiber 206A of the downstream optical combiner 206 are connected to each other at a fusion splice portion 245 by fusion splicing, and the second amplification optical fiber 20 and the delivery fiber 7 are connected to each other at a fusion splice portion 246 by fusion splicing. Optical fibers 4A extending from the pumping light sources 4 are connected to input fibers 206B of the downstream optical combiner 206 at fusion splice portions 248 by fusion splicing. Furthermore, the low-reflectivity portion 32 and the intermediate optical fiber 209 are connected to each other at a fusion splice portion 244 by fusion splicing. The intermediate optical fiber 209 and an input fiber 206B of the downstream optical combiner 206 are connected to each other at a fusion splice portion 249 by fusion splicing.

In one or more embodiments, an optical cavity 102 is formed by the high-reflectivity portion 31, the first amplification optical fiber 10, and the low-reflectivity portion 32. When pumping light from the pumping light sources 3 is provided to the optical cavity 102, laser oscillation is caused within the optical cavity 102 to generate seed light. The seed light is supplied to the core 21 of the second amplification optical fiber 20 via the downstream optical combiner 206. Furthermore, the inner cladding layer 22 of the second amplification optical fiber 20 is supplied with pumping light from the pumping light sources 4. When the pumping light passes through the core 21 of the second amplification optical fiber 20, the active element doped to the core 21 absorbs the pumping light so that the active element is excited to amplify the seed light propagating through the core 21 by stimulated emission. The pumping light sources 4 may be omitted so that amplification of the seed light in the second amplification optical fiber 20 is performed by pumping light from the pumping light sources 3.

With the fiber laser apparatus 201 thus configured, the first cooling plate 51 to which the first amplification optical fiber 10 is fixed and the second cooling plate 52 to which the second amplification optical fiber 20 is fixed are housed in one gain module box 71 as described with reference to FIG. 4. Thus, the height (thickness) H of all of the module boxes 71 occupying the interior of the enclosure 70 can be reduced.

Furthermore, the length of the intermediate optical fiber 209 connecting between the amplification optical fiber 10 and 20 can be reduced. Therefore, the stimulated Raman scattering generated by the intermediate optical fiber 209 can be reduced.

In the optical cavity 102, light is recursively reflected between the high-reflectivity portion 31 and the low-reflectivity portion 32. The light passes through the upstream first amplification optical fiber 10 many times, and the seed light passes through the downstream second amplification optical fiber only in one direction toward a downstream side of the second amplification optical fiber. Therefore, if the first amplification optical fiber 10 is bent, the beam quality is more likely to be degraded as compared to a case where the second amplification optical fiber 20 is bent. Accordingly, in order to increase a bend radius of the first amplification optical fiber 10 as much as possible, the size of the first cooling plate 51 on which the first amplification optical fiber 10 may be greater than the size of the second cooling plate 52 on which the second amplification optical fiber 20 is arranged as shown in FIG. 5. With such a configuration, a space for routing the intermediate optical fiber 209 can be ensured, and the beam quality can be prevented from being degraded by a small bend radius of the first amplification optical fiber 10.

As described above, according to one or more embodiments, there is provided a fiber laser apparatus capable of outputting a high-power laser beam with a compact structure. The fiber laser apparatus has a plurality of amplification optical fibers each including a core to which an active element has been doped. The plurality of amplification optical fibers have different amplification characteristics. The fiber laser apparatus also has at least one cooling plate having a first cooling surface held in thermal contact with a first amplification optical fiber of the plurality of amplification optical fibers so as to be capable of cooling the first amplification optical fiber and a second cooling surface held in thermal contact with a second amplification optical fiber of the plurality of amplification optical fibers so as to be capable of cooling the second amplification optical fiber, at least one module box including a gain module box that houses the plurality of amplification optical fibers together with the at least one cooling plate, and an enclosure housing the at least one module box. The first cooling surface and the second cooling surface of the at least one cooling plate are arranged at different heights within the gain module box. At least a portion of the first cooling surface and the second cooling surface is arranged so as to overlap with each other as viewed along a height direction.

With this configuration, a plurality of amplification optical fibers are housed together with at least one cooling plate in one gain module box. Therefore, the height of all of the module boxes occupying the interior of the enclosure can be reduced as compared to a case where the respective amplification optical fibers are housed in separate module boxes. Furthermore, the length of an optical fiber connecting between the amplification optical fibers can be reduced. Therefore, the stimulated Raman scattering generated by the optical fiber connecting between the amplification optical fibers can be reduced.

The first cooling surface and the second cooling surface of the at least one cooling plate may be formed by opposite surfaces of a single cooling plate. In this case, two amplification optical fibers can be arranged on a single cooling plate. Therefore, the thickness of the gain module box can be reduced as compared to a case where two amplification optical fibers are arranged on separate cooling plates, respectively. As a result, the height of all of the module boxes occupying the interior of the enclosure can further be reduced.

The first cooling surface of the at least one cooling plate may be formed by one surface of a first cooling plate, and the second cooling surface of the at least one cooling plate may be formed by one surface of a second cooling plate different than the first cooling plate. With this configuration, two amplification optical fibers are arranged on separate cooling plates. Therefore, heat generated by one of the two amplification optical fibers is inhibited from exerting influence on the other amplification optical fiber arranged on the other cooling plate.

The first cooling surface of the first cooling plate and the second cooling surface of the second cooling plate may be arranged so as not to face each other. In this case, even if one of the two amplification optical fibers is broken so that light leaks out of the amplification optical fiber, the light that has leaked out of the one amplification optical fiber is inhibited from causing damage to the other amplification optical fiber because the one amplification optical fiber does not face the other amplification optical fiber.

The first cooling plate and the second cooling plate may have different sizes. With this configuration, a space for routing an optical fiber connecting between the amplification optical fiber arranged on one surface of the first cooling plate and the amplification optical fiber arranged on one surface of the second cooling plate can be formed between the first cooling plate and the second cooling plate. The length of the optical fiber connecting between the amplification optical fibers can further be reduced. Therefore, the stimulated Raman scattering generated by the optical fiber connecting between the amplification optical fibers can further be reduced.

The first amplification optical fiber may be connected upstream of the second amplification optical fiber. The size of the first cooling plate may be greater than the size of the second cooling plate. Thus, when the size of the first cooling plate on which the upstream first amplification optical fiber, which is more likely to affect the beam quality, is arranged is greater than the size of the second cooling plate on which the downstream second amplification optical fiber is arranged, the beam quality can be prevented from being degraded by a small bend radius of the first amplification optical fiber.

The fiber laser apparatus may further have an intermediate optical fiber connecting between the first amplification optical fiber and the second amplification optical fiber. In this case, at least one of the first cooling plate and the second cooling plate may have a fiber hole or a notch formed therein for allowing the intermediate optical fiber to pass therethrough. When the intermediate optical fiber passes through the fiber hole or the notch, the length of the intermediate optical fiber connecting between the amplification optical fibers can be reduced. Therefore, the stimulated Raman scattering can be reduced.

In each of the first cooling plate and the second cooling plate, a passage for allowing a cooling medium to pass therethrough, an inlet port for supplying the cooling medium to the passage, and an outlet port for discharging the cooling medium that has passed through the passage may formed. In this case, the fiber laser apparatus may further have a connection pipe connecting the outlet port of one of the first cooling plate and the second cooling plate and the inlet port of the other cooling plate. With this configuration, the same cooling medium can be used for the first cooling plate and the second cooling plate. Therefore, a required quantity of the cooling medium can be reduced as compared to a case where different cooling media are used for adjacent cooling plates.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE NUMERALS AND SIGNS

1, 201, 101 Fiber laser apparatus
2, 102, 202 Optical cavity
3, 4 Pumping light source
5, 6, 206 Upstream optical combiner
7 Delivery fiber
8 Laser output portion
9, 108, 109, 209 Intermediate optical fiber
10 First amplification optical fiber
20 Second amplification optical fiber
31 High-reflectivity portion
32 Low-reflectivity portion
41-49, 145, 146, 244-246, 248, 249 Fusion splice portion
51 First cooling plate
51A Upper surface (first cooling surface)
51B Lower surface
52 Second cooling plate
52A Upper surface (second cooling surface)
53, 56 Cooling water passage
54, 57 Inlet port
55, 58 Outlet port
61 Feed water pipe
62 Drain water pipe
63 Connection pipe
70 Enclosure
71 Module box
73 Fiber hole
81 First group of optical components
82 Second group of optical components
110 Third amplification optical fiber
151 Third cooling plate
181 Third group of optical components

What is claimed is:

1. A fiber laser apparatus, comprising:

amplification optical fibers including a first amplification optical fiber and a second amplification optical fiber, each of the amplification optical fibers having different amplification characteristics and comprising a core to which an active element is doped;

one or more cooling plates having a first cooling surface that thermally contacts and cools the first amplification optical fiber and a second cooling surface that thermally contacts and cools the second amplification optical fiber;

one or more module boxes including a gain module box that houses the amplification optical fibers and the one or more cooling plates; and an enclosure housing the one or module boxes, wherein the first cooling surface and the second cooling surface are disposed at different heights in a height direction in the gain module box, at least a portion of the first cooling surface overlaps at least a portion of the second cooling surface as viewed along the height direction, a first cooling plate of the one or more cooling plates has the first cooling surface, a second cooling plate of the one or more cooling plates has the second cooling surface, and the first cooling plate and the second cooling plate are different in size.

2. The fiber laser apparatus according to claim 1, wherein the first amplification optical fiber is connected upstream of the second amplification optical fiber, and the first cooling plate is larger than the second cooling plate.

3. The fiber laser apparatus according to claim 1, wherein each of the first cooling plate and the second cooling plate includes:

a passage through which a cooling medium passes, an inlet port that supplies the cooling medium to the passage, and an outlet port that discharges the cooling medium from the passage.

4. The fiber laser apparatus according to claim 3, further comprising a connection pipe connecting the outlet port of one of the first cooling plate and the second cooling plate to the inlet port of the other of the first cooling plate and the second cooling plate.

5. The fiber laser apparatus according to claim 1, wherein the amplification optical fibers are connected in series to each other.

6. The fiber laser apparatus according to claim 1, wherein the first cooling surface does not face the second cooling surface.

7. The fiber laser apparatus according to claim 1, further comprising:

an intermediate optical fiber connecting the first amplification optical fiber to the second amplification optical fiber; and one or both of the first cooling plate and the second cooling plate have a fiber hole or a notch in which the intermediate optical fiber is disposed.

* * * * *